(12) United States Patent
Paine et al.

(10) Patent No.: US 8,077,630 B2
(45) Date of Patent: Dec. 13, 2011

(54) VOICE OVER INTERNET PROTOCOL DIAGNOSTICS

(75) Inventors: James W. Paine, York, PA (US); Robert K. Dedrick, Hartsdale, NY (US); Lee N. Goodman, Tyngsboro, MA (US); Rezwanul Azim, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 114 days.

(21) Appl. No.: 12/490,679

(22) Filed: Jun. 24, 2009

(65) Prior Publication Data

US 2010/0329130 A1    Dec. 30, 2010

(51) Int. Cl.
*H04L 1/00*   (2006.01)
*H04L 12/26*  (2006.01)
*H04L 12/28*  (2006.01)
*H04L 12/66*  (2006.01)
*H04J 1/02*   (2006.01)

(52) U.S. Cl. ........ 370/252; 370/248; 370/494; 370/495; 370/352

(58) Field of Classification Search .......... 370/248, 370/252, 253, 352–356, 493–495
See application file for complete search history.

(56) References Cited

U.S. PATENT DOCUMENTS

| 6,389,005    | B1 * | 5/2002  | Cruickshank    | 370/352   |
| 2007/0002763 | A1 * | 1/2007  | Hulyalkar et al. | 370/252 |
| 2007/0189262 | A1 * | 8/2007  | Kim et al.     | 370/347   |
| 2007/0286351 | A1 * | 12/2007 | Ethier et al.  | 379/32.01 |

* cited by examiner

*Primary Examiner* — Ronald Abelson

(57) ABSTRACT

Embodiments disclose a method that may be used for diagnosing, for example, Voice over Internet Protocol (VoIP) sessions. The method may include establishing a first streaming session between a first telephone and a server using session control messages and establishing a second streaming session between the first telephone and a second telephone using session control messages. The method may further include transmitting or receiving data packets using the second streaming session, wherein the data packets carry voice or video data between the first and second telephones. The method may further include echoing the session control messages used to establish the second streaming session or the data packets carrying the voice or video data to the server using the first streaming session.

24 Claims, 8 Drawing Sheets

100

200

600

VOICE OVER INTERNET PROTOCOL DIAGNOSTICS

BACKGROUND INFORMATION

Businesses and individuals increasingly rely on Voice over Internet Protocol (VoIP) for communications. In such systems, Session Initiation Protocol (SIP) may be used as an application-layer control (e.g., signaling) protocol for creating, modifying, and terminating sessions (e.g., phone calls) with one or more participants. In addition to phone calls, SIP and IP may be used for video calls, multimedia conferences, and instant messaging conferences.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
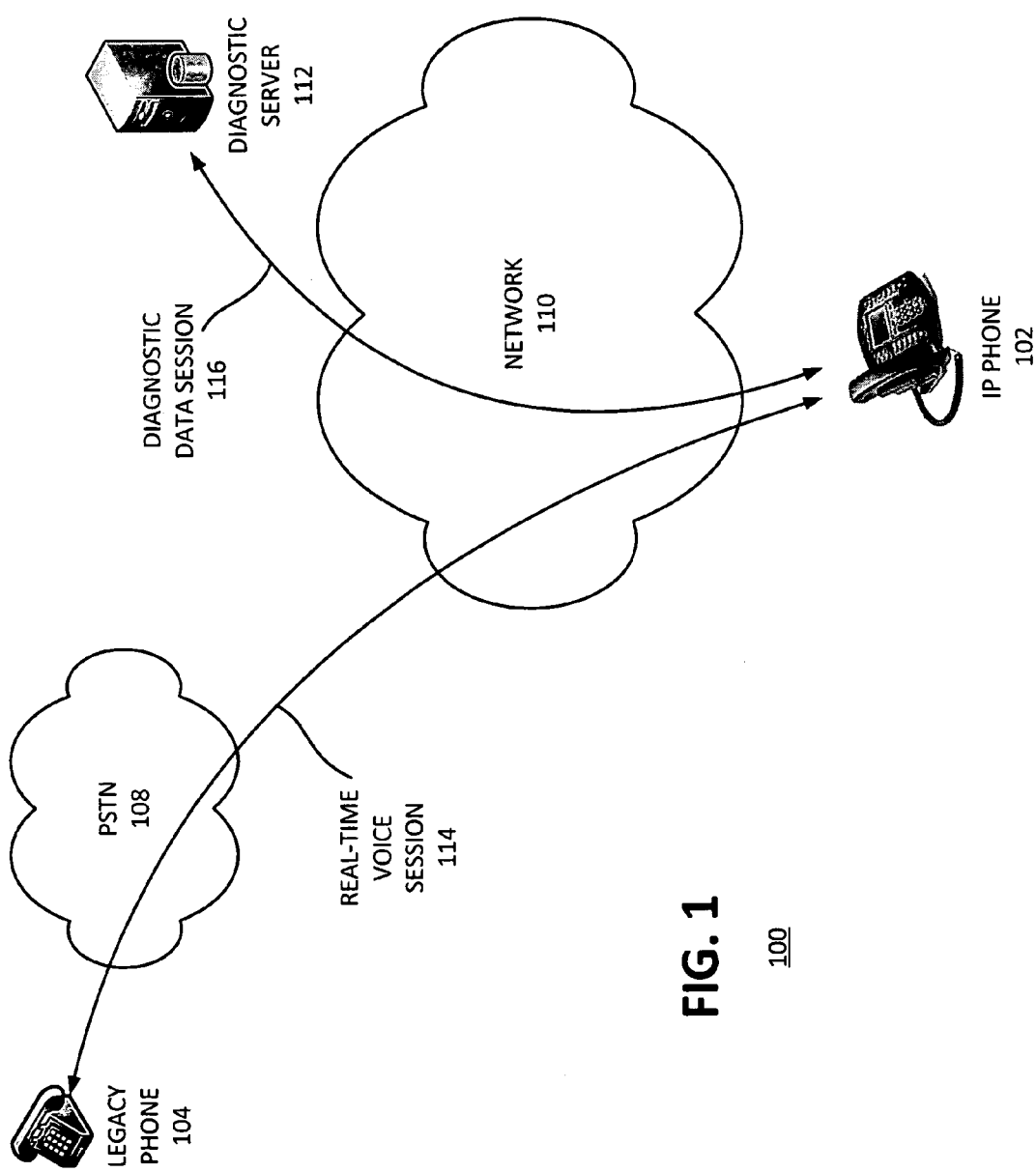
FIGS. 1 and 2 are block diagrams of networks in which embodiments described herein may be implemented.

As discussed above, VoIP allows for phone calls, for example, between user devices. As shown in FIG. 1, a real-time voice session 114 (e.g., a call) may be established between an IP phone 102 and a legacy phone 104. Unfortunately, many problems may occur when placing a call between two such devices. For example, the SIP messaging that established session 114 may not have properly negotiated voice session 114. Or, the network in which IP phone 102 resides may not be configured properly and voice session 114 may be unintentionally blocked. There are countless problems that could occur, and these problems may require the help of a trained network technician.

Embodiments disclosed herein allow for a diagnostic session 116 to be established between IP phone 102 and a diagnostic server 112. In one embodiment, SIP signaling for establishing voice session 114 may be echoed to diagnostic server 112 over diagnostic session 116. In addition, the real-time media packets of voice session 114 may also be echoed to diagnostic server 112 over diagnostic session 116. In these embodiments, network technicians may analyze the data echoed to diagnostic server 112 and may diagnose problems remotely. In one embodiment, diagnostic session 116 may include a real-time protocol (RTP) session (e.g., a "voice path") to carry the echoed diagnostic data.

In addition, it is not unusual for IP phone 102 to be behind a firewall or other network device that, conventionally, may have required network configuration to allow diagnostic session 116 to traverse the network to reach diagnostic server 112. In one embodiment disclosed herein, however, diagnostic session 116 may traverse the various private and public networks from IP phone 102 to diagnostic server without reconfiguring network devices. For example, in one embodiment, diagnostic session 116 may travel from IP phone 104 to diagnostic server 112 without having to open ports in firewalls that would not be opened otherwise. Thus, a service provider may, in one embodiment, diagnose technical issues in an "unmanaged" network, e.g., a network without an administrator.

Although implementations are described below in the context of SIP and Internet Protocol (IP), in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among user devices connected to a network. Although SIP messages are shown for convenience, any type of protocol or a mixture of such protocols may be applied in various parts of the overall system. As used herein, a "session control protocol" includes any protocol, such as SIP and H.323, to set up and/or tear down sessions. A session control protocol includes session control messages exchanged between network devices to negotiate and establish the session.

Figure 2:
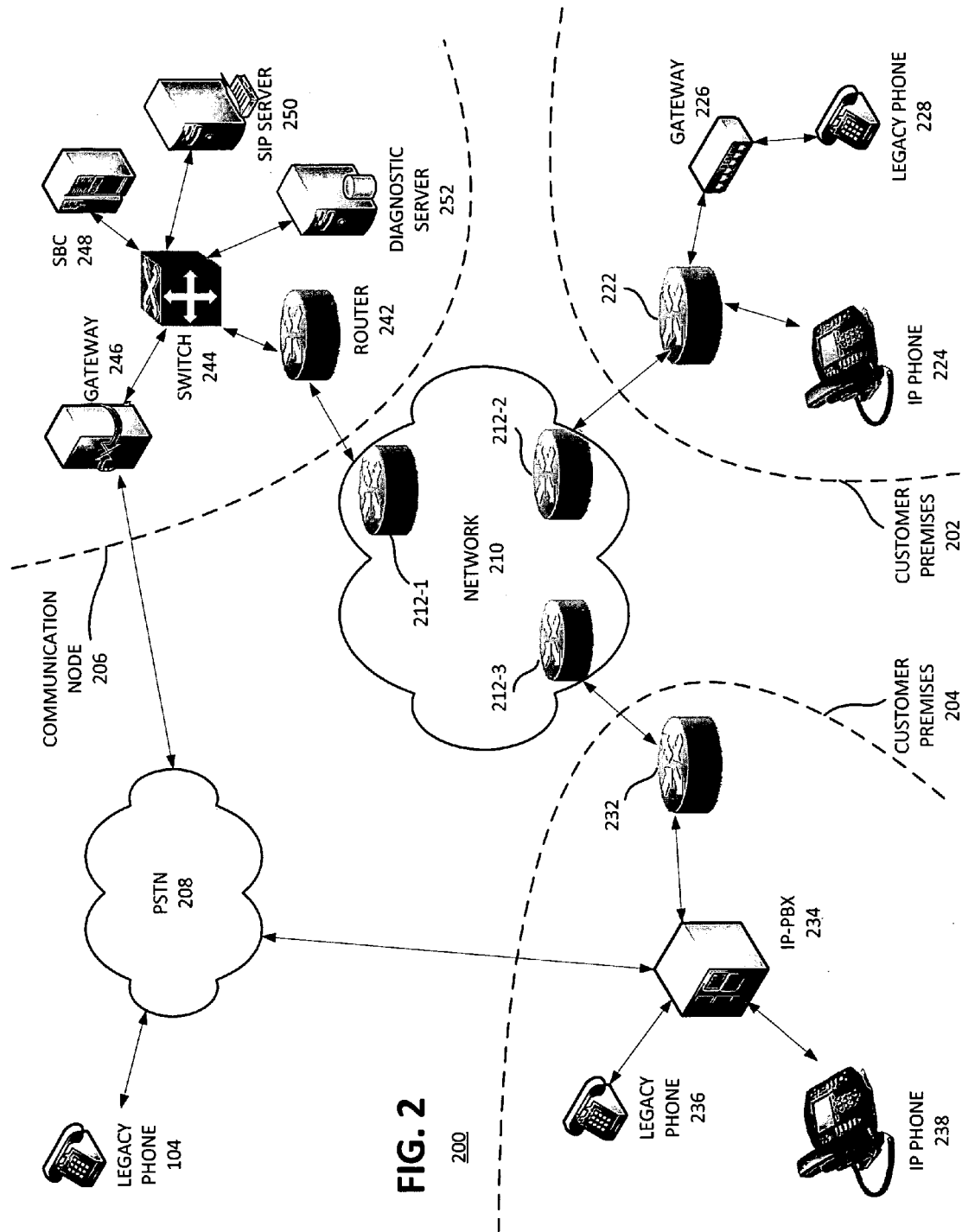

FIG. 2 is a diagram of a network 200 in which embodiments described herein may be implemented. Network 200 includes a customer premises 202, a customer premises 204, a communication node 206, a PSTN 208, and a network 210. As shown in FIG. 2, customer premises 202 may include a customer edge (CE) network device 222, an IP phone 224, a gateway 226, and a legacy phone 228.

IP phone 224 may allow a user to place and receive calls (e.g., voice and/or video calls) to other devices. For example, the user of IP phone 224 may place a call to IP phone 238 (located in customer premises 204). In one implementation, IP phone 224 may be, for example, a Verizon Hub™ phone. Although IP phone 224 is described as a "phone," it may include a personal digital assistant (PDA), a laptop computer, a desktop computer, a netbook computer, an Internet tablet, a mobile phone, or another type of computing device. IP phone 224 may include one or more computer modules for hosting programs, databases, and/or applications. For example, IP phone 224 may host a SIP user agent (UA) for establishing real-time protocol (RTP) sessions with other phones.

Legacy phone 228 may include an analog telephone typical of a public-switched telephone network (PSTN). Gateway 226 may include a SIP proxy and/or a SIP UA to allow legacy phone 228 to connect to CE network device 222 for placing VoIP calls to other devices. For example, gateway 226 may allow the user of legacy phone 228 to call IP phone 238. From the perspective of legacy phone 228, it is dealing with a PSTN, not a packet switched network because gateway 226 handles the packet switching.

CE network device 222 may include a router, a switch, a firewall, a session border controller (SBC), and/or a SIP proxy. CE network device 222 may receive data (e.g., a packet) on one port and may forward the received data on another port in the direction of the destination of the data. For example, CE network device 222 may receive a SIP message from IP phone 224 and may forward the SIP message to provider edge (PE) router 212-2 for forwarding to SIP server 250 in communication node 206. Likewise, CE network device 222 may receive a SIP message from PE router 212-2 and may forward the SIP message to IP phone 224.

In one embodiment, CE network device 222 may perform the functions of a firewall. For example, CE network device 222 may employ a NAT router, such that unsolicited incoming packets from network 210 may be dropped. In the case of a sophisticated institution, CE network device may perform the functions of an SBC. As such, CE network device 222 may block packets from entering or leaving customer premises 202 when the packets do not conform to a particular security policy. For example, CE network device 222 may block all packets that do not appear to form part of a telephone call (e.g., the packets are not SIP messages or the corresponding RTP packets carrying voice and/or video data).

As also shown in FIG. 2, customer premises 204 may include a CE router 232, an IP-Private Branch Exchange (PBX) 234, a legacy phone 236, and an IP phone 238. Network 210 may include a PE router 212-1, a PE router 212-2, and a PE router 212-3 (individually PE router 212-x, collectively PE routers 212).

IP phone 238 and legacy phone 236 may perform the same or similar functions as IP phone 224 and legacy phone 228, respectively, described above. Likewise, CE network device 232 may perform the same or similar functions as CE network device 222 described above.

In the case of customer premises 204, IP phone 238 and legacy phone 236 are coupled to IP-PBX 234. IP-PBX 234 may provide a direct connection to PSTN 208 for legacy phone 236. IP-PBX 234 may also provide a SIP proxy (not shown) for IP phone 238 and/or a SIP UA for legacy phone 236. In this embodiment, IP-PBX 234 may allow IP phone 238 to connect to PSTN 208 directly from IP-PBX 234 or indirectly through network 210 and communication node 206. Likewise, IP-PBX 234 may allow legacy phone 236 to connect to other devices through IP-PBX 234, CE network device 232, and network 210 (e.g., using a SIP UA in IP-PBX 234).

Communication node 206 may include a router 242, a switch 244, a gateway 246, a session border controller (SBC) 248, a SIP server 250, and a diagnostic server 252. Router 242 may perform the functions of a switch as well as a router. Router 242 may receive data (e.g., a packet) on one port and may forward the received data on another port in the direction of the destination of the data. In the implementation shown in FIG. 2, router 242 may receive data from network 210 for forwarding to other devices in communication node 206, and vice versa.

Switch 244 may perform the functions of a router as well as a switch. Switch 244 may receive data (e.g., a packet) on one port and may forward the received data on another port in the direction of the destination of the data. In the implementation of FIG. 2, switch 244 may primarily forward data among devices in communication node 206.

SIP server 250 may provide SIP services to user devices, such as IP phone 224 or IP phone 238. For example, SIP server 250 may store the universal resource indicator (URI) and network address of IP phone 224 for the domain associated with SIP server 250. Thus, when a user calls IP phone 224 (using the URI of IP phone 224), SIP server 250 may be able to locate IP phone 224 using its network address. For example, SIP server 250 may be associated with the domain "sipserver.com." SIP server 250 may store the URI of IP phone 224, which may be sip:202.408.4281@sipserver.com and the associated network address of IP phone 224, which may be 10.1.1.224. In one embodiment, SIP server 250 may also store a URI of IP phone 224 associated with the product serial number of IP phone 224. For example, SIP server 250 may store the URI sip:12345@sipserver.com (where 12345 is the serial number of IP phone 224) and associate that URI with the same network address of IP phone 224, e.g., 10.1.1.224.

SBC 248 may help control the SIP messaging and RTP media streams for the SIP services provided by communication node 206. In one embodiment, SBC 248 may perform some of the functions of a firewall, e.g., blocking malicious floods of INVITE messages. In another embodiment, SBC 248 may cooperate with a firewall by opening and closing ports for RTP media streams as sessions are set up and torn down.

Diagnostic server 252 may store copies of SIP messages and/or RTP media streaming packets that may be forwarded from user devices, such as IP phone 224. Diagnostic server 252 may store these data for analysis by a network administrator or by an automated network analysis process to resolve problems encountered by the user of a user device, such as IP phone 224, for example.

Gateway 246 may allow a packet switched network (e.g., communication node 206 and network 210) to communicate with a circuit switched network (e.g., PSTN 208). Thus, a VoIP call may be placed from an IP phone (e.g., IP phone 224) to a legacy phone (e.g., legacy phone 104) and vice versa.

PSTN 208 may provide traditional telephone services for legacy phones, such as legacy phone 104. Network 210 may provide network services such that devices in customer premises 204, customer premises 202, and communication node 206 may communicate among each other and to devices attached to PSTN 208. Network 210 may include one or more wired and/or wireless networks that are capable of receiving and transmitting data, voice and/or video signals, including multimedia signals that include voice, data and video information. Network 210 may also include one or more wireless networks and may include a number of transmission towers for receiving wireless signals and forwarding the signals toward the intended destinations. Network 180 may further include one or more packet switched networks, such as an Internet protocol (IP) based network, a local area network (LAN), a wide area network (WAN), a personal area network (PAN), an intranet, the Internet, or another type of network that is capable of transmitting data. In an exemplary implementation, network 210 may also include a private IP (PIP) network used to route data. In an exemplary implementation, network 210 may include Multi-Protocol Label Switching (MPLS) network.

Network 210 may include one or more PE routers 212. Each of PE routers 212 may perform the functions of a switch as well as a router. PE routers 242 may each receive data on one port and may forward the received data on another port in the direction of the destination of the data.

In one embodiment, network 210 may be controlled and operated by the same organization as communication node 206. In another embodiment, network 210 may be controlled and operated by the same organization as customer premises 202, e.g., a different organization than that controlling communication node 206. In yet another embodiment, network 210 may be controlled and operated by an organization other than the organizations operating communication node 206 and/or customer premises 202.

The exemplary configuration illustrated in FIG. 2 is provided for simplicity. Network 200 may include more or fewer devices than illustrated in FIG. 2. For example, network 100 may include additional elements, such as switches, gateways, routers, customer premise equipment, etc., that aid in routing traffic, such as telephone calls, data, etc. In some implementations, the functions performed by two or more devices may be performed by any one device. Likewise, in some implementations, the functions performed by any one device may be performed multiple devices.

Figure 3:
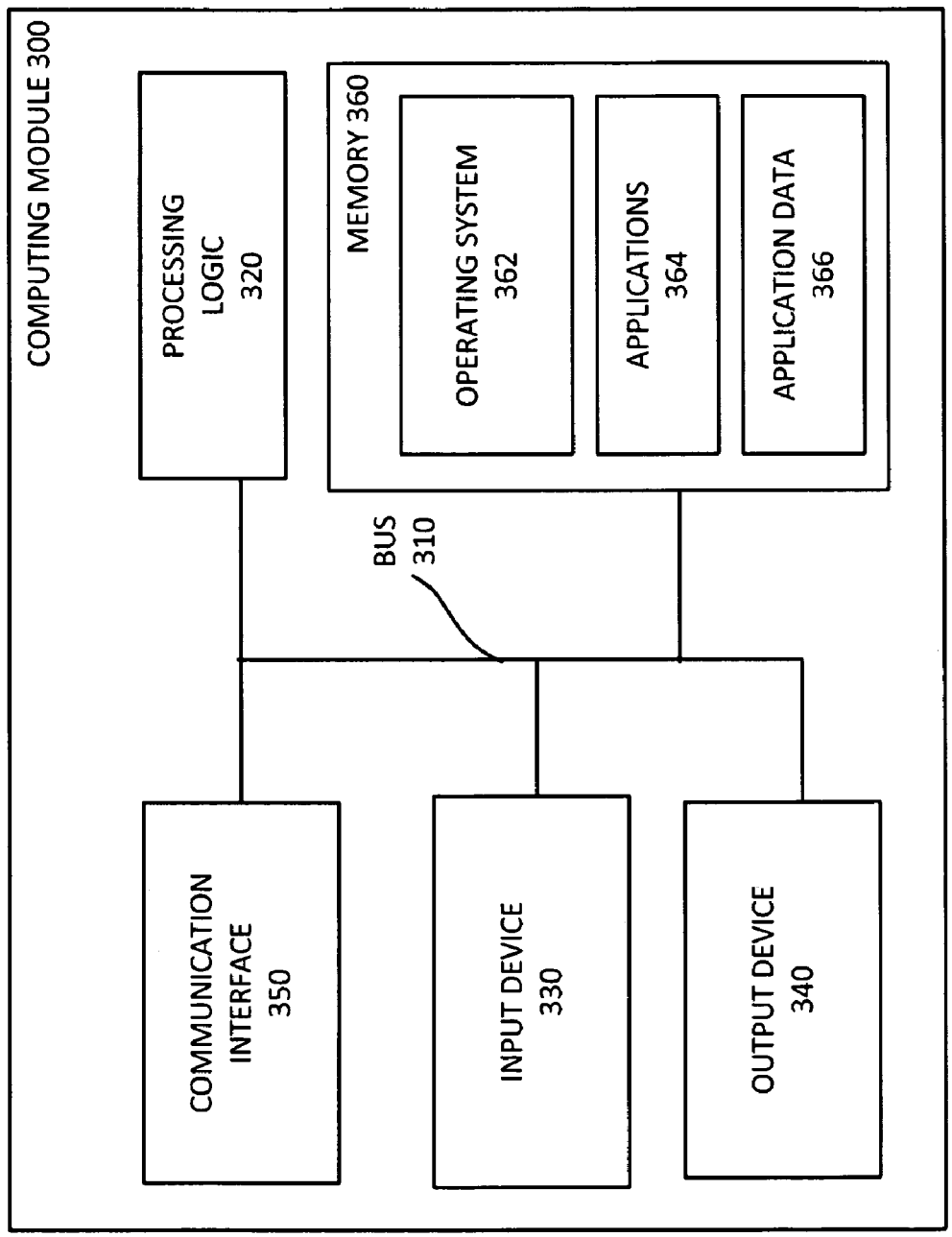
FIG. 3 is a block diagram of exemplary components of a computing module that may be included in devices in the network of FIG. 2.

FIG. 3 is a block diagram of exemplary components of a computing module 300. Devices 202-206, for example, may each include one or more computing modules 300. Client computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into computing module 300, such as a keyboard (e.g., the keypad of IP phone 224), a mouse, a pen, a microphone, a remote control, a touch-screen display, etc. Some devices, such as SIP server 250, switch 244, router 242, and diagnostic server 252 may be managed remotely and may not include input device 330. In other words, some devices may be "headless" and may not include a keyboard, for example.

Output device 340 may include a device that outputs information to the user, such as a display, a printer, a speaker, etc. For example, IP phone 224 and IP phone 238 may each include an LCD for outputting information to the user or speaker to alert the user of incoming calls. Some devices, such as SIP server 250, switch 244, router 242, and diagnostic server 252 may be managed remotely and may not include output device 340. In other words, some devices may be "headless" and may not include a display or speaker, for example.

Input device 330 and output device 340 may allow the user to activate a particular service or application, such as a voice-mail application, contacts application, or diagnostics application. Input device 330 and output device 340 may allow the user to receive and view a menu of options and select from the menu options. The menu may allow the user to select various functions or services associated with applications executed by client computing module 300.

Communication interface 350 may include a transceiver that enables client computing module 300 to communicate with other devices and/or systems. Communication interface 350 may include a transmitter that may convert baseband signals to radio frequency (RF) signals and/or a receiver that may convert RF signals to baseband signals. Communication interface 350 may be coupled to an antenna for transmission and reception of the RF signals. Communications interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface for communicating with Bluetooth devices, a near-field communication (NFC) interface, etc. Communications interface 350 may also receive, transmit and/or process digital or analog audio inputs/outputs and/or digital or analog video inputs/outputs.

Memory 360 may include a random access memory (RAM) or another type of dynamic storage device that may store information and instructions; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

Memory 360 may include an operating system (OS) 362, one or more applications 364, and application data 366. OS 362 may include software instructions for managing hardware and software resources of computing module 300. In the case of IP phone 224, for example, OS 362 may include Linux, Windows, Symbian, Android, Windows Mobile, etc. In the case of SIP server 250, SBC 248, or gateway 246, for example, OS 362 may include Linux, Unix, or Windows Server. Applications 364 may provide network services or user applications, depending on the device in which the particular computing module 300 is found. Likewise, application data 366 may depend on the applications running in memory 360, which may depend on the device in which the particular computing module 300 is found.

Figure 4:
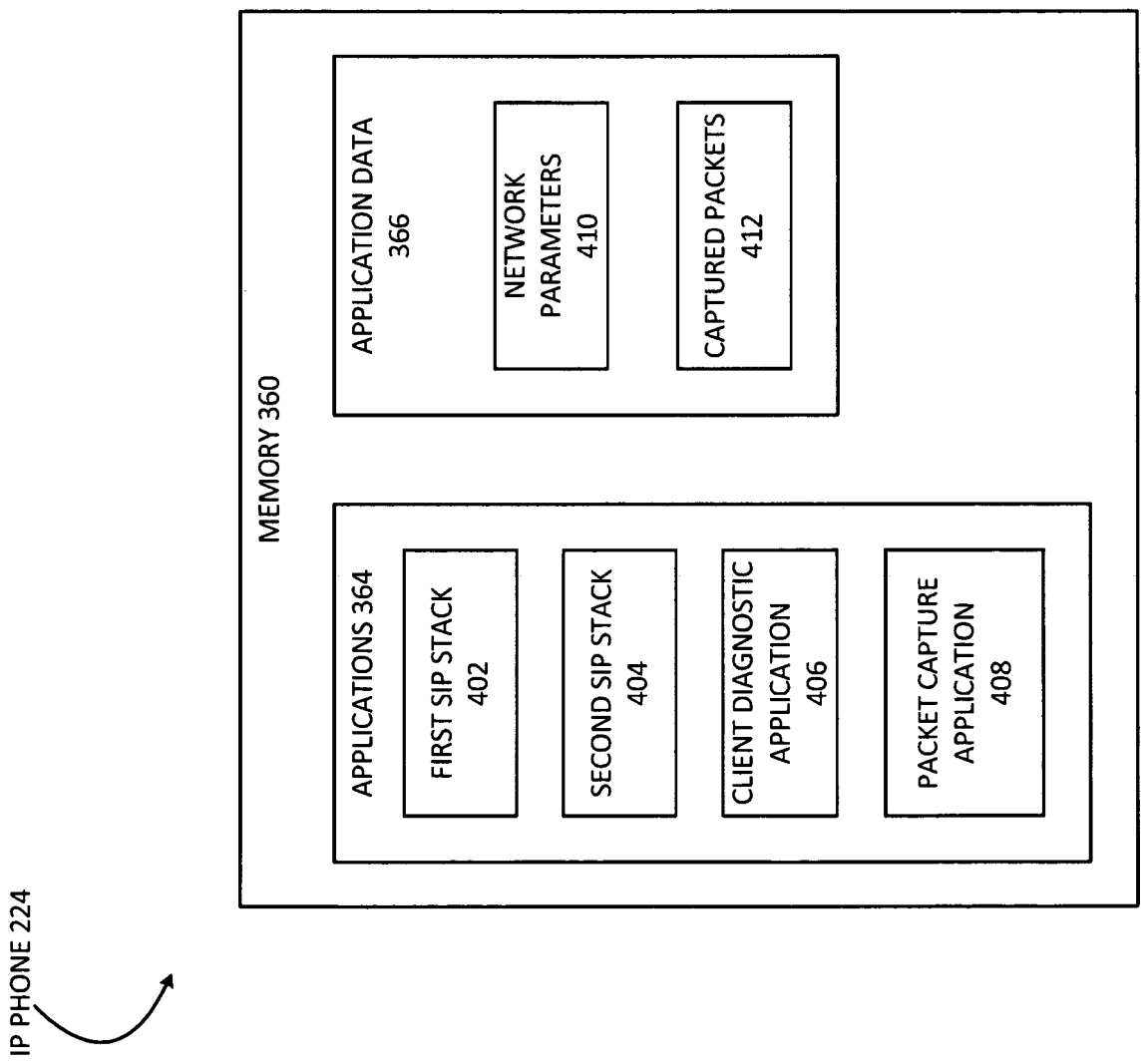
FIG. 4 is a block diagram of exemplary components included in the memory of the IP phone of the network of FIG. 2.

For example, FIG. 4 is a block diagram of exemplary components of memory 360 found in IP phone 224. In this case, applications 364 may include a first SIP stack 402 (e.g., part of a first SIP UA), a second SIP stack 404 (e.g., part of a second SIP UA), a client diagnostic application 406, and a packet capture application 408. Application data 366 may include network parameters 410 and captured packets 412.

First and second SIP stacks 402 and 404 may receive packets (e.g., SIP packets) for setting up and tearing down sessions between devices, such as between IP phone 224 and IP phone 238, for example. First and second SIP stacks 402 and 404 may be state-full, meaning that each may remember the state of the session or the state of the establishment of the session between devices. In the embodiment of FIG. 4 (e.g., IP phone 224 with two SIP stacks), IP phone 224 may establish two separate sessions between itself and other devices. In another embodiment, memory 360 may include only a single SIP stack.

Client diagnostic application 406 may measure network parameters for diagnosing or measuring the health of a network and sessions established by SIP stacks 402 and 404. Such parameters may include packet loss, jitter, latency, reorder and/or audio volume, and application data 366 may include these measured network parameters 410. Client diagnostic application 406 may launch packet capture application 408 when requested by, for example, a diagnostic server and/or the user of IP phone 224 or periodically. Packet capture application 408 may store packets received and/or transmitted by IP phone 224. Packet capture application 408 may include, for example, TCPdump, a command-line, open-source application for Linux, Solaris, and BSD. Packet capture application 408 may also include, for example, Wireshark, another open-source packet capture application. Application data 366 may include such captured packets 412. Client diagnostic application 406 may include an application to gather non-call based diagnostic information. For example, client diagnostic application 406 may include as network analysis tool for discovering other devices in the network, determining the local network type (e.g., network address transversal (NAT), full-cone NAT, restricted cone NAT, port-restricted cone NAT, etc), scanning ports of other network devices, etc.

In one embodiment, client diagnostic application 406 may be included in a device (e.g., IP phone 224) during manufacturing of the device. In another embodiment, client diagnostic application 406 may be loaded onto a device from an external USB drive plugged into the device when the device requires diagnostic services. For example, the user of a device could call her VoIP service provider with a problem. The service provider could send the external USB drive to the user for loading client diagnostic application on the device that requires diagnostics. In one embodiment, instead of sending a USB drive, the service provider could send another phone for performing the diagnostics. In another embodiment, client diagnostic application 406 may be downloaded and installed in the device, e.g., IP phone 224. In one embodiment, first SIP stack 402 and/or second SIP stack 404 may be used to establish a connection to diagnostic server 252, for example, to download or update client diagnostic application 406. In one embodiment, the connection used to download or update client diagnostic application 406 may include a RTP session (e.g., a "voice path") to carry data.

Figure 5:
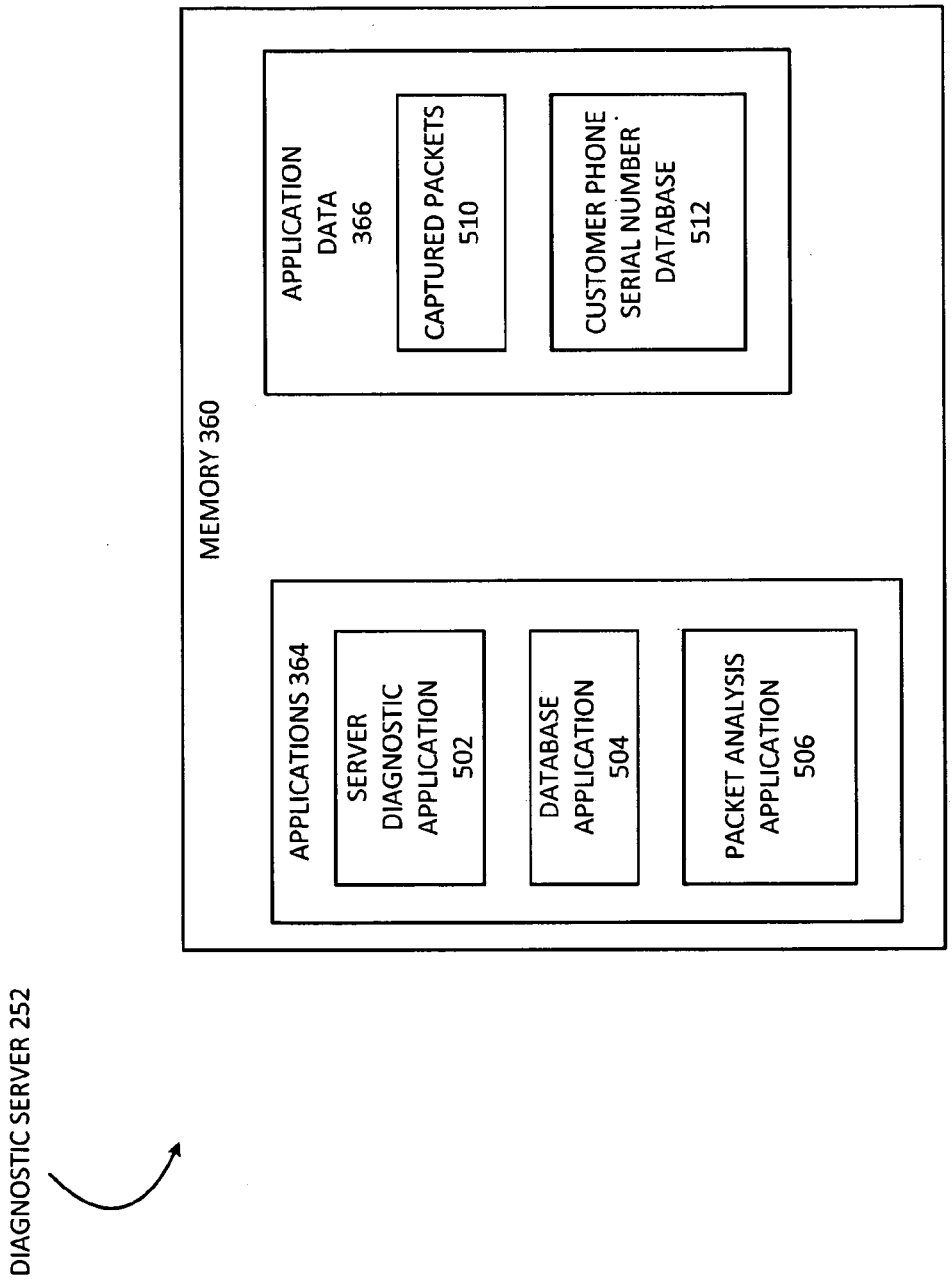
FIG. 5 is a block diagram of exemplary components of the memory included in the diagnostic server of the network of FIG. 2.

FIG. 5 is a block diagram of exemplary components of memory 360 found in diagnostic server 252. In this case, applications 364 may include a server diagnostic application 502, a database application 504, and/or a packet analysis application 506. Application data 366 may include captured packets 510 and a customer phone serial number database 512.

Server diagnostic application 502 may establish a diagnostic session between it and another device, such as IP phone 224. Server diagnostic application may request the capturing of packets at the device and forwarding of the captured packets to diagnostic server 252. As such, application data 366 of diagnostic server 252 may include captured packets 410.

Packet analysis application 506 may allow a service technician to replay the packets echoed (e.g., retransmitted) to diagnostic server 252 (stored in captured packets 510) from a device, such as IP phone 224. Packet analysis application 506 may include, for example, Wireshark. Packet analysis application 506 may also include, for example, TCPdump, but Wireshark may be preferred by a technician because of its graphical user interface. Customer-phone serial number database 504 may store a relation between the serial number of a phone, the customer, and the network address of the phone, for example.

Computing module 300 may perform certain operations, as described herein. Computing module 300 may perform these operations in response to processing logic 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described herein.

As discussed above, embodiments disclosed herein allow for a diagnostic session to be established between an IP phone and a diagnostic server for the diagnosis of problems encountered by the IP phone. In the following example the user of IP phone 224 picks up the handset and calls IP phone 238, but she experiences problems either making the call or during the call. Because, in this example, the user does not have an in-house expert, she contacts her VoIP service provider. The service provider controls and operates communication node 206 and, in some embodiments, network 210. In this example, with the help of a technician from the service provider, the user is asked to repeat the troubled call to IP phone 238. During this repeated attempt, the SIP messages to establish a session between IP phone 224 and IP phone 238 may be echoed (e.g., retransmitted) to diagnostic server 252. In addition, the real-time packets (e.g., the voice data) of the session between IP phone 224 and IP phone 238 may be echoed (e.g., retransmitted) to diagnostic server 252. Thus, the technician may use the tools provided for in communication node 206 to diagnose the problem the user of IP phone 224 is having. In addition, the user of IP phone 224 may not have to reconfigure her local network or extended network (e.g., WAN) to allow the data to be echoed to diagnostic server 252.

Figure 6:
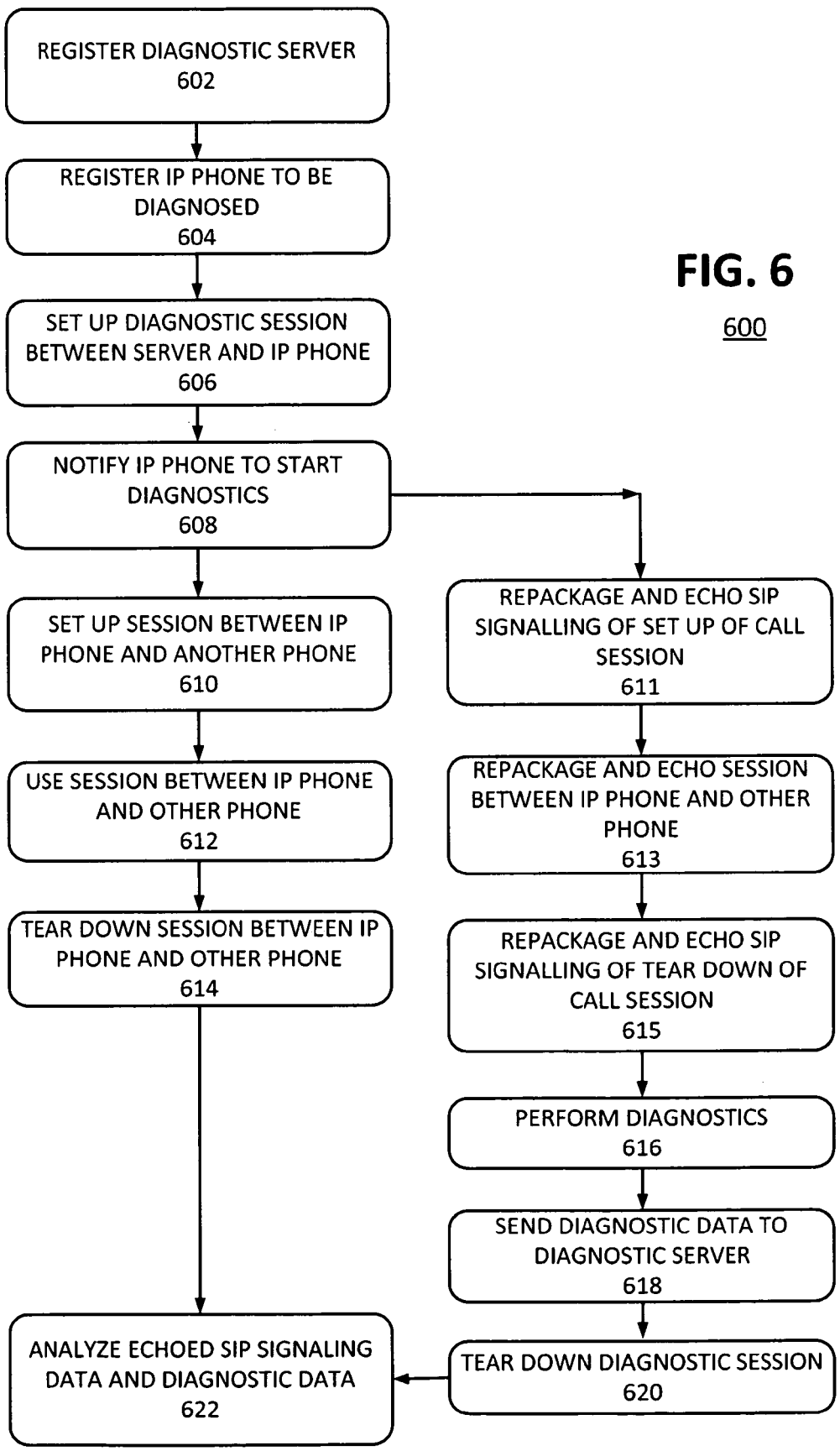
FIG. 6 is a flowchart of an exemplary process for diagnosing potential problems with a voice call placed over the network of FIG. 2.
Figure 7:
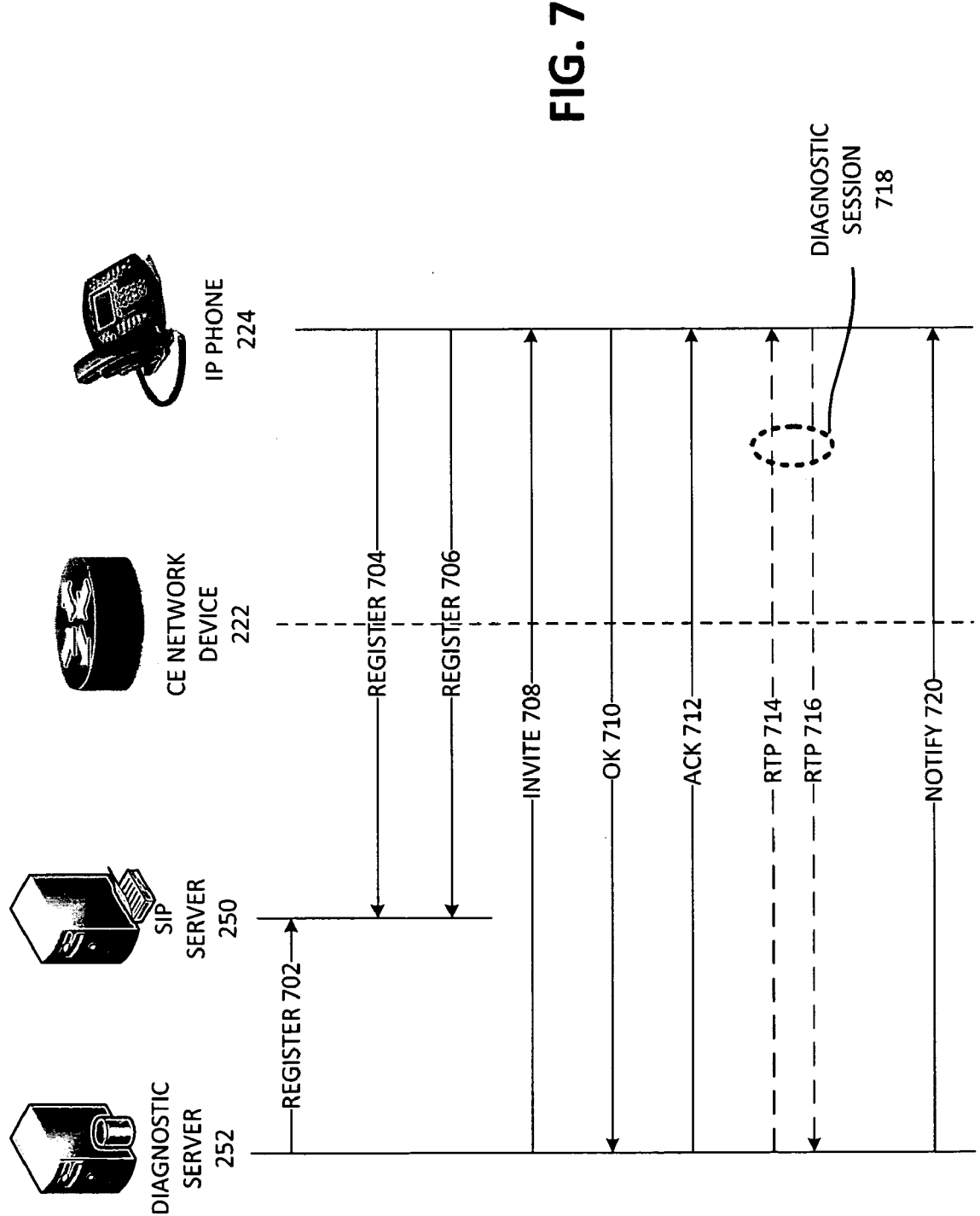
FIGS. 7 and 8 are signal diagrams of exemplary SIP messages and real-time protocol sessions and packets that may pass between devices in the network of FIG. 2 during the execution of the process of FIG. 6.
Figure 8:
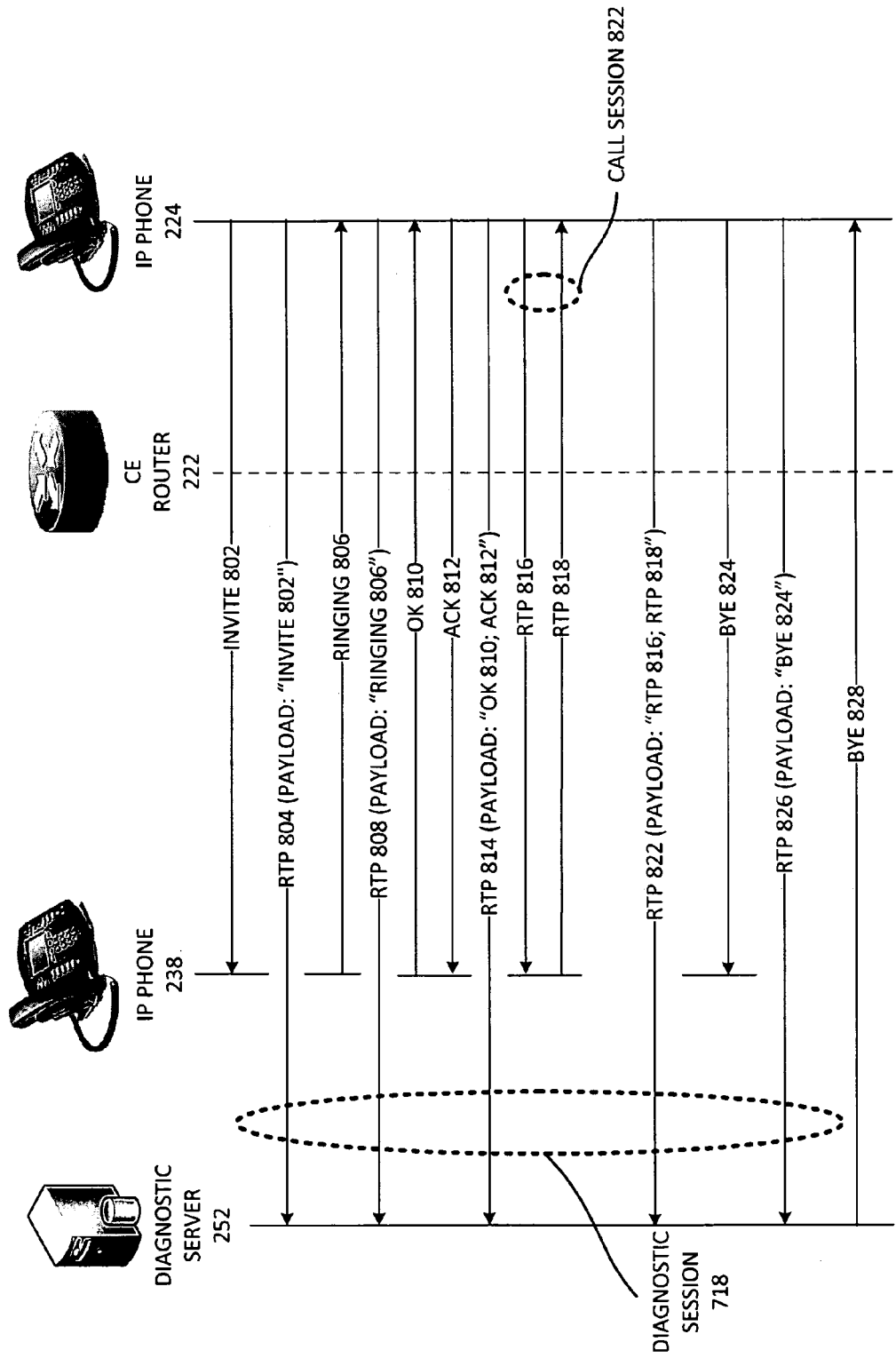

FIG. 6 is a flowchart of an exemplary process 600 for diagnosing potential problems with SIP signaling and/or sessions established by the SIP signaling. FIG. 6 is described with respect to FIGS. 7 and 8. FIGS. 7 and 8 are signal diagrams of exemplary SIP messages and RTP sessions that may pass between devices in network 200 during execution of process 600. Process 600 may be performed by software in IP phone 224 (e.g., client diagnostic application 406, first and second SIP stack 402 and 404, and/or packet capture application 408), in diagnostic server 252 (e.g., diagnostic server application 50, database application 504, and packet analysis application 506), and/or software stored in other devices in network 200.

The diagnostic server may be registered (block 602). For example, diagnostic server 252 may register itself as a SIP device with SIP server 250. To accomplish this, diagnostic server 252 may send a REGISTER message 702 to SIP server 250. Register message 702 may include the URI of diagnostic server 252, e.g., sip:diagnostic.server@sipserver.com. Thus, incoming SIP requests (e.g., INVITE messages) from other devices to sip:diagnostic.server@sipserver.com may be directed to the proper IP address for diagnostic server 252.

The IP phone to be diagnosed may also be registered (block 604). For example, IP phone 224 may register itself as a SIP device with SIP server 250. To accomplish this, IP phone 224 may send a REGISTER message 704 to SIP server 250. In one embodiment, IP phone 224 may register twice with SIP server 250, e.g., once for telephone calls from other users and once for a diagnostic session with diagnostic server 252. For the first registration, IP phone 224 may send a REGISTER message 704 to SIP server 250. Register message 704 may include a publically available URI of IP phone 224, e.g., sip:202.408.4281@sipserver.com. For the second, diagnostic registration, IP phone 224 may send REGISTER message 706 to SIP server 250. REGISTER message 706 may include a URI of IP phone 224, e.g., sip:12345@sipserver.com, where "12345" is the unique serial number of IP phone 224.

A diagnostic session may be set up between the diagnostic server and the IP phone to be diagnosed (block 606). For example, to establish a session between IP phone 224 and diagnostic server 252, diagnostic server 252 may send an INVITE message 708 to IP phone 224. The invite message may request a real-time session or a streaming session (e.g., an RTP session) between diagnostic server 252 and IP phone 224 and vice versa. IP phone 224 may, in response to INVITE message 708, send OK message 710 to diagnostic server 252. In one embodiment, IP phone 224 may recognize INVITE message 708 as being from diagnostic server 252 and may automatically send OK message 710 to diagnostic server 252. In another embodiment, the user of IP phone 224 may be prompted before IP phone 224 sends OK message 710. For example, IP phone 224 could display the message: "Do you want to establish a diagnostic session between your phone and your service provider? Establishing a diagnostic session may allow your service provider to record calls until the diagnostic session is ended."

In response to OK message 710, diagnostic server 252 may send ACK 712 to IP phone 224 acknowledging receipt of OK message 710. As a result of INVITE message 708, OK message 710, and ACK message 712 an RTP session 714 may be initiated between diagnostic server 252 and IP phone 224 and an RTP session 716 may be initiated between IP phone 224 and diagnostic server 252. Together, RTP sessions 714 and 716 may form a diagnostic session 718 between IP phone 224 and diagnostic server 252. RTP sessions 714 and 716 are indicated with a dashed line because, although a session has been established, it may not be carrying data as of yet.

In this embodiment, because INVITE message 708, OK message 710, and ACK message 712 include the type of packets (e.g., headers and payloads) expected by CE network device 222, CE network device 222 allows these messages to pass through it to/from IP phone 224 from/to diagnostic server 252. Further, because diagnostic session 718 was initiated in the expected way, CE network device 222 may also allow data to pass through RTP sessions 714 and 716. For example, CE network device 222 may have been inspecting SIP messages 708-712 (e.g., possibly acting as a SIP proxy) and may have opened two pinholes through a firewall to carry RTP stream sessions 714 and 716.

The IP phone may be notified to start diagnostics (block 608). Diagnostic server 252 may send a NOTIFY message 720 to IP phone 224. NOTIFY message 720 may include instructions for IP phone 224 to start a diagnostic process, such as capturing all or some packets received or sent by IP phone 224. Like the other SIP messages 708-712, CE network device 222 may pass NOTIFY message 720 because it includes the type of packets expected by CE network device 222. In one embodiment, the user of IP phone 224 may be prompted before IP phone 224 starts to capture packets. For example, IP phone 224 could display the message: "Do you want to record call information to send to your service provider for diagnosing any problems?"

A call session may be set up between the IP phone and another phone (block 610). For example, the user of IP phone 224 may pick up the handset and call IP phone 238. In this example, IP phone 224 may send an INVITE message 802 to IP phone 238. IP phone 238 may respond with a RINGING message 806, which may be heard as an audible ring by the user of IP phone 224. When the user of IP phone 238 picks up the handset, IP phone 238 may send OK message 810 to IP phone 224, which may be acknowledged by IP phone 224 by sending an ACK message 812 to IP phone 238. In this case, SIP messages 802, 806, 810, and 812 may establish RTP data streams 816 and 818, which may be considered a call session 820. RTP data streams 816 and 818 may be used for carrying, for example, voice and/or video between IP phone 224 and IP phone 238.

The SIP signaling of the setting up of the call session between the IP phone and the other phone may be repackaged and echoed to the diagnostic server (block 611). For example, after IP phone 224 sends INVITE message 802 to IP phone 238, INVITE message 802 may be repackaged and sent to diagnostic server 252 as RTP packet(s) 804 using diagnostic session 718 (e.g., RTP streaming session 716). The repackaged packet(s), for example, may include one or more SIP message packets (e.g., INVITE message 802) in its payload. Repackaging of packets is described in more detail below. Further, after IP phone 224 receives RINGING message 806 from IP phone 238, IP phone 224 may repackage RINGING message 806 and send it to diagnostic server 252 as RTP packet(s) 808 using diagnostic session 718 (e.g., as part of RTP session 716). Further, after IP phone 224 receives OK message 810 and ACK message 812, IP phone 224 may repackage and send SIP messages 810 and 812 to diagnostic server 252 as RTP packet(s) 814 using diagnostic session 718 (e.g., as part of RTP session 716). In one embodiment, because RTP packet(s) 804, 808, and 814 are of the type expected by CE network device 222 during a typical phone call, CE network device 222 may allow RTP packet(s) to pass through its perimeter security.

The call session between the IP phone and the other phone may be used (block 612) for, e.g., a call between the two phones. In the above example, call session 820 may be used to carry voice traffic between IP phone 224 and IP phone 238. That is, RTP data stream 816 may carry the voice of the user of IP phone 238 to IP phone 224. Likewise, RTP data stream 818 may carry the voice of the user of IP phone 224 to IP phone 238. The call session between the IP phone and the other phone may be echoed to the diagnostic server (block 613). For example, IP phone 224 may echo packets received and/or sent in call session 820 in RTP packet(s) 822, e.g., over RTP session 716 of diagnostic session 718. In one embodiment, IP phone 224 may put the received packets from RTP stream 816 in the payload of RTP packet(s) 822 of diagnostic session 718. Other diagnostic information may also be sent to diagnostic server 252 other than SIP signaling and RTP streams 816 and/or 818. For example, non-call based diagnostic information may be sent to diagnostic server 252, such as information about customer premises 202 discovered by a network analysis tool component of client diagnostic application 406 (e.g., the network type, other devices in the network, firewall information, etc). Diagnostic information may also include information included in RTP control protocol (RTCP).

The session between the IP phone and the other phone may be torn down (block 614). After the user of IP phone 224 and IP phone 238 are done with their conversation, for example, the user of IP phone 224 may hang up, which may trigger IP phone 224 to send BYE message 824 to IP phone 238. The SIP signaling of the tearing down of the session between the IP phone and the other phone may be echoed to the diagnostic server (block 615). Bye message 824, like the SIP messages before it may be echoed to diagnostic server 252 in RTP signal 826.

Other diagnostics may be performed (block 616). For example, IP phone 224 may measure the latency, jitter, reorder, packet loss and/or audio volume of packets received from IP phone 238 during the call session 820 and/or during other call sessions or SIP signaling. This additional diagnostic information (e.g., latency, jitter, reorder, and/or packet loss) may be stored by IP phone 224. The diagnostic information may be sent to the diagnostic server (block 618). IP phone 224 may send the diagnostic information to diagnostic server 252 on a periodic basis. Alternatively, IP phone 224 may send the diagnostic information to diagnostic server 252 when the amount of information reaches a certain level, e.g., when IP phone 224 does not have sufficient memory to store more information.

The diagnostic session may be torn down (block 618). After sufficient diagnostic data has been collected, for example, diagnostic server 252 may send BYE message 828 to IP phone 224 to end diagnostic session 718. In one embodiment, the user of IP phone 224 may be prompted that the diagnostic session is over and call information is not being recorded.

The diagnostic server may analyze the echoed SIP signaling data and diagnostic data received during the diagnostic session (block 622). At this point, diagnostic server 252 may unpack the SIP messages and RTP streaming signals that were passed between IP phone 224 and IP phone 238. Diagnostic server 252 may then analyze the data using a packet analyzer, such as Wireshark.

In the embodiment discussed above, process 600 echoes SIP messages (e.g., INVITE message 802, RINGING message 806, OK message 810, ACK message 812, and BYE message 824) and/or RTP streams 816 and 818 immediately after these messages or streams were received. In other embodiments, SIP messages and/or RTP streams may be echoed after a period of time or when a sufficient number of data has been accumulated. For example, in one embodiment, process 600 may echo SIP messages to diagnostic server 252 after call session 820 has been established and may echo RTP streams 816 and/or 818 to diagnostic server 252 during call session 822. In yet another embodiment, process 600 may echo SIP messages or RTP streams 816 and/or 818 to diagnostic server 252 after call session 822 has been torn down.

Blocks 611, 613, and 615, discussed above may include "repackaging" data to be sent to diagnostic server 252 over diagnostic session 718 in RTP packet(s) 804, 808, 814, and 822. In addition, diagnostic data may be sent to diagnostic server 252 after being "packaged" in RTP packet(s) 826. In one embodiment, the time of arrival of packets to be echoed is recorded and sent to diagnostic server 252 along with the echoed packet. The recording of the arrival time may allow the diagnostic server to more accurately replay packets as they are received by IP phone 224. In this embodiment, a technician could hear the same thing that the user of IP phone 224 hears if, for example, reorder, latency, packet loss, or jitter, reduces the quality of audible data.

As mentioned above, the SIP messages to establish a session and the RTP packets of the session (along with time stamp data, etc) may be included in the payload of the RTP packets of diagnostic session 718. Thus, the RTP packets in diagnostic session 718 appear typical of a phone call (e.g., the packets may have the same type of header information) even though its payload may not. As such, CE network device 222 and/or SBC 248 may allow RTP packets in diagnostic session 718 to pass, even given the security measures employed by CE network device 222 and/or SBC 248.

In one embodiment, repackaging packets may include compressing and/or encrypting the packets. In one embodiment, diagnostic session 718 may be considered a "tunnel" (e.g., an "RTP tunnel") between IP phone 224 and diagnostic server 252. In this embodiment, IP phone 224 may use other standard protocols to collect, repackage, encrypt, and send packets to diagnostic server 252. For example, IP phone 224 may collect a number of packets, compress the collection, and then send the packets through the RTP tunnel (e.g. using a secure shell (SSH) tunnel that employs the RTP tunnel). In another embodiment, the payloads of the RTP packets in diagnostic session 718 may be formed to appear like typical RTP payloads, e.g., to appear like media (e.g., voice and/or video). In this embodiment, if CE network device 222 performs deep packet inspection (DPI) to analyze the payload, CE network device 222 may still pass the RTP packets in diagnostic session 718 because the packets appear as typical media.

In one embodiment, the voice data in call session 822 may be echoed to diagnostic server 252. In one embodiment, the voice data in call session 822 that is echoed to diagnostic server 252 may include test voice or sound data rather than the user's actual voice. In this embodiment, RTP stream 816 and/or RTP stream 818 may include test voice or sound data. For example, IP phone 238 may introduce test voice or sound data into RTP stream 818 and/or IP phone 224 may introduce test voice or sound data into RTP stream 816. Test voice or sound data may allow for the automation of diagnosis by diagnostic server 252. In another embodiment, the technician may listen to the test voice or sound to help diagnose the problems. In another embodiment, repackaging may include removing data from the packet to be echoed. For example, to protect the privacy of the users, some data (e.g., voice data or other personal data) may be removed from packets that are echoed to diagnostic server 252.

Although IP phone 224 may include client diagnostic application 406 and other applications, client diagnostic application may also be stored in other devices in network 200. For example, client diagnostic application 406 may be stored in gateway 226 and/or IP-PBX 234. Thus, a diagnostic session may be opened between gateway 226 and diagnostic server 252 when diagnosing problems, for example, with VoIP calls placed by legacy phone 228. In addition, a diagnostic session may be opened between IP-PBX 234 and diagnostic server 252 when diagnosing problems, for example, with VoIP calls placed by legacy phone 236 or IP phone 238.

Embodiments described above may employ multiple SIP stacks to establish two or more simultaneous sessions (e.g., a call session and a simultaneous diagnostic session). In another embodiment, these sessions may take place sequentially. In this embodiment, only one SIP stack may be employed. For example, SIP messaging could notify IP phone 224 to start capturing packets (possibly without establishing a diagnostic session or if one is established, tearing it down). Then a call session may be established between two IP phones while packets are captured. After the call session ends, a diagnostic session may be established between IP phone 224 and diagnostic server 252 to echo the captured packets. This embodiment may require more memory in IP phone 224 to store all the captured packets.

Embodiments described above involve real-time or streaming sessions (e.g., voice, video, and/or call sessions) between two IP phones. Other embodiments may include other types of sessions between other types of devices. In addition, the diagnostic session between the device to be diagnosed and the diagnostic server may be any type of session and, in one embodiment, the type of session that a CE network device will allow to pass. In the case of IP telephony, the type of session that a CE network device will allow to pass may include a streaming or real-time session (e.g., such as a RTP multimedia session).

As used herein, "echo," "echoing," or "echoed" a packet to diagnostic server 252 means to send a full copy of the packet, a partial copy of the packet, or information indicative of the packet to diagnostic server 252. As used herein, "multimedia" may include any combination of voice, video, and/or data. Further, establishing a session "between" a first phone and a second phone includes establishing only a session from the first phone to the second phone (e.g., RTP 816), establishing only a session from the second phone to the first phone (e.g., RTP 818), or both (e.g., call session 822 including both RTP 816 and RTP 818).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
    establishing a first streaming session between a first telephone and a network device using session control messages;
    establishing a second streaming session, different than the first streaming session, between the first telephone and a second telephone using session control messages;
    transmitting or receiving data packets using the second streaming session, wherein the data packets carry voice or video data between the first and second telephones;
    transmitting the data packets carrying the voice or video data, from the first telephone to the network device, as a payload of one or more packets in the first streaming session; and
    indicating, in the one or more packets in the first streaming session, a time that at least one of the data packets carrying the voice or video data was received by the first telephone through the second streaming session.

2. The method of claim 1, further including:
    transmitting the session control messages used to establish the second streaming session, from the first telephone to the network device using the first streaming session.

3. The method of claim 2, wherein the session control messages used to establish the second streaming session include session initiation protocol (SIP) messages or H.323 messages and wherein the first streaming session includes a real-time protocol (RTP) session.

4. The method of claim 2, wherein transmitting the session control messages or the data packets includes transmitting the session control messages, used to establish the second streaming session, using the first streaming session.

5. The method of claim 2, wherein transmitting the session control messages or the data packets includes:
    transmitting at least one entire session control message, used to establish the second streaming session, using the first streaming session, or
    transmitting at least one of the data packets carrying the voice or video data, excluding the voice or video data, to the network device using the first streaming session.

6. The method of claim 1, wherein a portion of the first streaming session and a portion of the second streaming session occur simultaneously.

7. The method of claim 1, further comprising:
    receiving, using the first streaming session, the data packets carrying the voice or video data; and
    replaying the voice or video data, received using the first streaming session, to diagnose a problem in the second streaming session.

8. A network device comprising:
    a transceiver to receive and send session control messages to establish a first streaming session between the network device and a diagnostic device, and to receive and send session control messages to establish a second streaming session, different than the first streaming session, between the network device and another network device;
    wherein the transceiver is configured to
        send data packets representing multimedia to the other network device using the second streaming session,
        receive data packets representing multimedia from the other network device using the second streaming session, and
        send the sent or received data packets representing multimedia to the diagnostic device using the first streaming session, wherein the transceiver is configured to send the data packets representing multimedia as payloads of packets in the first streaming session with indications of when one or more of the data packets representing multimedia were received by the network device.

9. The device of claim 8, wherein the transceiver is configured to send the session control messages used to establish the second streaming session to the diagnostic device in the first streaming session.

10. The device of claim 9, wherein the session control messages include session initiation protocol (SIP) messages or H.323 messages and wherein the first streaming session includes a real-time protocol (RTP) session.

11. The device of claim 8, wherein the transceiver is configured to send only a portion of one of the data packets representing multimedia as a payload of one of the packets in the first streaming session.

12. The device of claim 8, further comprising:
    a processor to perform diagnostic measurements of the second streaming session,
    wherein the transceiver is configured to send the diagnostic measurements to the diagnostic device in the first streaming session.

13. The device of claim 12, wherein the diagnostic measurements include measurements of jitter, latency, reorder, packet loss, or audio volume.

14. The device of claim 8, wherein a portion of the first streaming session and a portion of the second streaming session occur simultaneously.

15. A computer-readable medium including instructions to be executed by a processor, the instructions including one or more instructions to:
    set up a first streaming session between a first telephone and a network device using session control messages;
    set up a second streaming session, different from the first streaming session, between the first telephone and a second telephone using session control messages;
    send or receive data packets using the second streaming session, wherein the data packets carry voice or video data between the first and second telephones; and
    one or more instructions to send, from the first telephone to the network device, one of the received data packets representing voice or video as a payload of one or more packets in the first streaming session with an indication of a time that the one of the received data packets representing voice or video was received by the first telephone over the second streaming session.

16. The computer-readable medium of claim 15, further including:
one or more instructions to send one of the sent data packets representing voice or video as a payload of one or more packets in the first streaming session.

17. The computer-readable medium of claim 15, further including:
one or more instructions to transmit, from the first telephone to the network device, the session control messages used to establish the second streaming session using the first streaming session.

18. The method of claim 15, wherein the session control messages include session initiation protocol (SIP) messages or H.323 messages and wherein the first streaming session includes a real-time protocol (RTP) session.

19. The computer-readable medium of claim 15, further including one or more instructions to set up the first streaming session to occur simultaneously with a portion of the second streaming session.

20. A system comprising:
a first network device including a transceiver to receive and send session control messages to establish a real-time call session between the network device and a second network device; and
a third network device including a transceiver to receive and send session control messages to establish a diagnostic session, different than the real-time call session, between the third network device and the first network device,
wherein the transceiver of the first network device is configured to
send data packets representing multimedia to the second network device using the real-time call session,
receive data packets representing multimedia from the second network device using the real-time call session, and
send one or more of the data packets representing multimedia to the third network device as payloads of packets in the diagnostic session with indications of when the one or more of the data packets representing multimedia were received in the first network device.

21. The system of claim 20, wherein the transceiver of the first network device is configured to send one or more of the session control messages to establish the real-time call session to the third network device as payloads of packets in the diagnostic session.

22. The system of claim 20, wherein the transceiver of the first network device is configured to send only a portion of one of the data packets representing multimedia as a payload in the diagnostic session.

23. The method of claim 20, wherein the session control messages include session initiation protocol (SIP) messages or H.323 messages and wherein the diagnostic session includes a real-time protocol (RTP) session.

24. The system of claim 20, wherein a portion of the real-time call session and a portion of the diagnostic session occur simultaneously.

\* \* \* \* \*